United States Patent [19]

Takamatsu et al.

[11] Patent Number: 4,756,962
[45] Date of Patent: Jul. 12, 1988

[54] MAGNETIC RECORDING MEDIUM

[75] Inventors: Shigeru Takamatsu, Komoro; Hideo Dobashi, Saku; Hitoshi Azegami, Nagano, all of Japan

[73] Assignee: TDK Corporation, Tokyo, Japan

[21] Appl. No.: 41,177

[22] Filed: Apr. 22, 1987

[30] Foreign Application Priority Data

Apr. 23, 1986 [JP] Japan .................................. 61-92405

[51] Int. Cl.$^4$ ............................................. G11B 5/708
[52] U.S. Cl. .................................. 428/329; 252/62.54; 427/128; 428/328; 428/694; 428/900
[58] Field of Search ............... 428/328, 329, 331, 694, 428/695, 900; 427/128; 360/134-136; 252/62.54

[56] References Cited

U.S. PATENT DOCUMENTS

| 4,109,408 | 8/1978 | Dessauer | 428/328 |
| 4,238,341 | 12/1980 | Kato | 428/329 |
| 4,460,651 | 7/1984 | Hosuka | 428/402 |
| 4,590,127 | 5/1986 | Hashimoto | 428/900 |
| 4,618,536 | 10/1986 | Morioka | 428/329 |
| 4,652,500 | 3/1987 | Ejiri | 427/128 |
| 4,670,337 | 6/1987 | Tokuoka | 428/329 |
| 4,671,993 | 6/1987 | Kadokura | 428/331 |

FOREIGN PATENT DOCUMENTS 176533 10/1982 Japan .
0082634 5/1984 Japan .................................. 428/429

Primary Examiner—Ellis P. Robinson
Attorney, Agent, or Firm—Seidel, Gonda, Goldhammer & Abbott

[57] ABSTRACT

A magnetic recording medium, comprising a plastic base coated with a magnetic layer of a ferromagnetic powder dispersed in a resin binder, contains in the magnetic layer $\alpha$-$Al_2O_3$ particles with an average particle size of 0.1 to 0.3 $\mu$m as determined by electron microscopy in an amount of more than 0.5% but less than 15% by weight on the basis of the ferromagnetic powder weight. The $\alpha$-$Al_2O_3$ particles have an $\alpha$-transformation rate of at least 50%. The powder is produced by an organic alumina process.

3 Claims, 1 Drawing Sheet

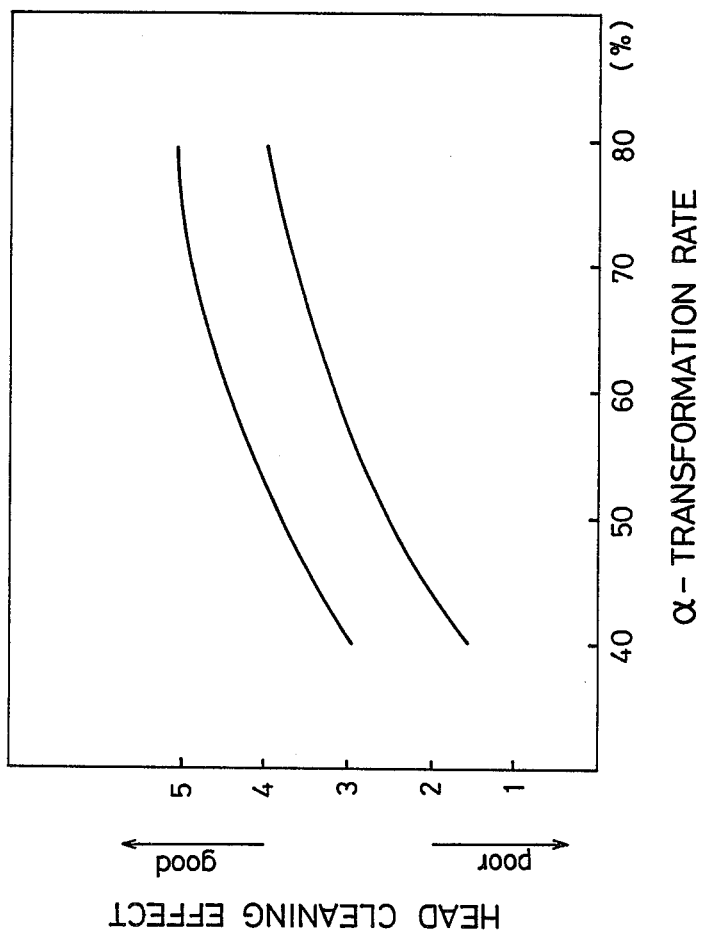

MAGNETIC RECORDING MEDIUM

BACKGROUND OF THE INVENTION

This invention relates to a magnetic recording medium, and more specifically to a magnetic recording medium containing α-Al$_2$O$_3$ particles in its magnetic layer.

In the manufacture of audio or video tapes, floppy disks, or other magnetic recording medium, it is a generally known practice to add some reinforcement to the magnetic layer so as to protect it from damage due to contact with magnetic heads. Particles of nonmagnetic inorganic material, such as Al$_2$O$_3$, Cr$_2$O$_3$, TiO$_2$, SiO$_2$, SiC, α-Fe$_2$O$_3$, or ZnO$_2$, are used for this purpose. An inorganic material of proper type, particle size, and proportion must be chosen; otherwise, damage or accelerated wear of the head, deterioration of the electromagnetic conversion characteristics, or other trouble can result. In recent years the demand for qualitative improvements of magnetic recording media, especially video tapes, has become severer than before. In order to meet the requirements for better picture quality, the adoption of microfine magnetic powders and highly dispersible binders, and smoothening of tape surface are under way. These measures are rather unfavorable, however, from the viewpoint of the magnetic coat durability or deposition on the head. For this reason greater durability and improved head cleaning effect are being called for. If the inorganic powders in common use are employed for such high picture quality video tapes, problems will arise including poor electromagnetic transfer characteristics, tape damage due to inadequate reinforcement, and insufficient head cleaning effect which, in turn, causes increased powder deposition on the head and inferior picture quality.

The present inventors have done intensive investigations with the hope of solving the problems associated with the improvements in the picture quality of video tapes through a proper choice of the type and particle size of inorganic material as a reinforcement of the magnetic coated film.

Among the existing nonmagnetic inorganic reinforcing materials, Cr$_2$O$_3$, Al$_2$O$_3$ and the like have been favorably evaluated. Nevertheless, they have not proved fully satisfactory when used directly as reinforcements for high picture quality magnetic recording media. The present inventors, in the hope of realizing the above object, studied Al$_2$O$_3$ particles, one of the desirable inorganic reinforcements. It is generally known that Al$_2$O$_3$ occurs stably in two crystalline forms, α-Al$_2$O$_3$ and γ-Al$_2$O$_3$. The latter is finer in particle size and softer than the former. On the other hand, α-Al$_2$O$_3$ is harder and coarser. For the reinforcement of magnetic recording media, either Al$_2$O$_3$ alone or a mixture of both is offered.

α-Al$_2$O$_3$, coarser and difficult to reduce the particle size, achieves a reinforcing effect, but is not a suitable reinforcing material for high picture quality magnetic tapes because of its danger of damaging the magnetic head and inferior electromagnetic transfer characteristics. γ-Al$_2$O$_3$ is also unsuitable because of low reinforcing effect and poor dispersion on account of the too fine particle size. In the Al$_2$O$_3$ mixture of α- and γ-types, therefore, the presence of γ-Al$_2$O$_3$ is of no appreciable merit.

It has not been found that an γ-Al$_2$O$_3$ produced by the organic alumina process and having an average particle size of 0.1 to 0.3 μm as measured by electron microscopy and being angular or jagged in the shape of the particles is excellent in electromagnetic transfer characteristics, running durability, head cleaning effect, and other properties and is suitable for use as a reinforcing material for video tapes of high picture quality.

The present invention therefore aims at providing a magnetic recording medium excellent in electromagnetic transfer characteristics and endurance running properties with limited deposition on heads.

SUMMARY OF THE INVENTION

The magnetic recording medium according to the invention is made by forming on a plastic base of polyester film or the like a magnetic layer consisting of ferromagnetic particles dispersed in a resin binder, characterized in that α-Al$_2$O$_3$ particles having an average particle size of 0.1 to 0.3 μm as measured by electron microscopy and being angular or jagged in the shape of the particles are added to the magnetic layer in an amount greater than 0.5% by weight but less than 15% by weight on the basis of the weight of the ferromagnetic particles.

The magnetic recording medium of the invention has outstanding properties including electromagnetic transfer characteristics, running durability, and head cleaning effect and is capable of offering video tapes of excellently high picture quality.

DETAILED DESCRIPTION OF THE INVENTION

The α-Al$_2$O$_3$ powder having an average particle size of 0.1 to 0.3 μm for use in the present invention is new to the art.

Known methods for the preparation of Al$_2$O$_3$ particles include Bayer and alum processes.

The alum process consists of the following steps:

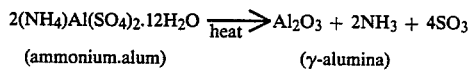

(ammonium.alum)   (γ-alumina)

The individual particles of the α-Al$_2$O$_3$ produced in this way are small but tend to aggregate, resulting in low dispersibility.

On the other hand, the Bayer process involves the following:

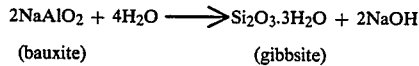

(bauxite)   (gibbsite)

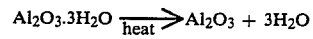

The α-Al$_2$O$_3$ obtained by this process is large in particle size and exhibits broad particle size distribution.

The present invention uses an α-Al$_2$O$_3$ produced by an organic Alumina process, which comprises the following steps:

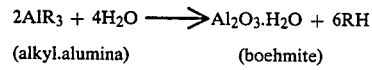

(alkyl.alumina)   (boehmite)

-continued

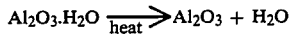

The $\alpha$-$Al_2O_3$ particles thus obtained are fine and generally uniform in particle size, coming within a narrow range of particle size distribution.

The organic alumina process is characterized in that, depending on the sintering conditions employed, it yields $\alpha$-$Al_2O_3$ particles finer than the product of any other process and, moreover, the rate of transformation to the $\alpha$ type in the crystal structure can be controlled and the shape of the particles can be widely changed. The $\alpha$-$Al_2O_3$ that is angular or jagged in the particle shape, has attained a high rate of $\alpha$-transformation in the crystal structure has greater grinding and polishing power and higher wear resistance than those of lower $\alpha$-transformation rates and of the round particle shape. The relationship between the head cleaning effect and the $\alpha$-transformation rate is shown in FIG. 1. Any $\alpha$-$Al_2O_3$ with an $\alpha$-transformation rate of 50% or more and angular particle shape combines a reinforcing effect with a head cleaning effect, and is suitable as a reinforcement for the high picture quality video tapes that require these two effects. The amount of the $\alpha$-$Al_2O_3$ to be added is chosen in consideration of the wear of the head, which varies largely with the types of the magnetic powder and resin binder to be employed. An amount from 0.5 to 15% by weight on the basis of the weight of the ferromagnetic powder is usually desirable. If the amount exceeds 15% by weight, even a combination of magnetic powder and resin binder that normally abrades the head negligibly will cause too much wear of the head for practical use. Any amount less than 0.5% by weight is meaningless to add, because it brings little reinforcing or cleaning effect. The $\alpha$-$Al_2O_3$ particles to be used should range in particle size from 0.1 to 0.3 $\mu$m. If the particle size is too small, the reinforcing effect decreases accordingly. Conversely an excessively large size adversely affects the electromagnetic transfer characteristics of the resulting medium and causes the endurance running of the medium to abrade and damage the head.

Examples of the magnetic recording medium according to the invention and comparative examples will now be explained in detail.

Although Co-$\gamma$-$Fe_2O_3$ was used as a ferromagnetic powder throughout the examples to be given below, the type of the ferromagnetic powder employed does not characterize the present invention. Any other ferromagnetic powder usually used for magnetic recording media, such as the powder of $\gamma$-iron oxide, magnetic metal, iron nitride, or barium ferrite, may be used instead. The resin binder that forms the magnetic layer does not characterize the invention, either. Other binders commonly used for magnetic recording media, such as thermoplastic, thermosetting, ultraviolet-curing, and aqueous binders, may also be used. A resin binder comprising urethane, vinyl chloride-vinyl acetate copolymer, and isocyanate as resin ingredients is particularly desirable. In order to reduce the friction of the magnetic layer and improve the running properties, it is possible to use as a lubricant a fatty acid having 12 to 20 carbon atoms or an ester prepared from the fatty acid and a monohydric alcohol having 3 to 12 carbon atoms or both.

EXAMPLES

Comparative Examples

TABLE 1

| | |
|---|---|
| Co-$\gamma$-$Fe_2O_3$ (BET 35 $m^2$/g) | 100 wt % |
| Vinyl chloride-vinyl acetate copolymer | 10 wt % |
| Urethane | 10 wt % |
| Carbon | 5 wt % |
| MEK | 250 wt % |
| Isocyanate | 5 wt % |
| $\alpha$-$Al_2O_3$ particles | 0.5-15 wt % |

Magnetic coating materials were prepared in conformity with the compounding ratio given in Table 1 with the exception that the type of $Al_2O_3$ particles was varied according to Table 2. Each of the compositions thus obtained was thoroughly mixed and dispersed by a ball mill and applied to a polyester film 15 $\mu$m thick. In this way samples of Examples and Comparative Examples were made.

TABLE 2

| | Type of $Al_2O_3$ particles | Average particle size | Rate of $\alpha$-transformation | Q'ty added | Sample No. |
|---|---|---|---|---|---|
| Example 1 | $\alpha$-$Al_2O_3$ | 0.2 $\mu$m | 70% | 5 wt % | #1 |
| Comp. Ex. 1 | $\gamma$-$Al_2O_3$ | 0.01 | — | 5 | 2 |
| Comp. Ex. 2 | $\alpha$-$Al_2O_3$ | 0.6 | 80 | 5 | 3 |
| Comp. Ex. 3 | " | 0.2 | 40 | 5 | 4 |
| Comp. Ex. 4 | " | 0.2 | 70 | 5 | 5 |
| Comp. Ex. 5 | " | 0.2 | 70 | 15 | 6 |
| Comp. Ex. 6 | " | 0.2 | 70 | 0.5 | 7 |

The sample of Example 1 is herein designated Sample #1 and the samples of Comparative Examples 1 to 6, Samples #2 to 7, respectively. With these samples the Y-S/N, head deposition, head damage, head wear, and still characteristics were determined. The results are given in Table 3. For these determinations video taperecorders manufactured by Matsushita Electric Industrial Co., Model NV-8200, deck type, were used. The measured values of Y-S/N represent relative values based on the value of the STD type tape manufactured by TDK Corp. The head deposition, head wear, and head damage are the conditions of heads observed and the amounts of wear measured after 100 runs or passages of the test tapes along the heads. As regards the ratings for the deposition on and the damage of the heads, the alphabet A represents "good", B "fair", and C "slightly poor", and D "poor". The still characteristics value is an indication of

TABLE 3

| Example No. | Sample No. | Y-S/N (dB) | Head depn | Head damage | Head wear ($\mu$) | Still (min) |
|---|---|---|---|---|---|---|
| 1 | #1 | +1.1 | A | A | 6 | 60 or more |
| Comp. 1 | 2 | +1.0 | C | A | 1 | 5 |
| Comp. 2 | 3 | +0.5 | A | C | 6 | 60 or more |
| Comp. 3 | 4 | +1.0 | B | A | 4 | 40 |
| Comp. 4 | 5 | +1.1 | B | A | 5 | 60 or more |
| Comp. 5 | 6 | +0.7 | A | A | 20 | 60 or more |
| Comp. 6 | 7 | +1.1 | C | A | 1 | 5 | the durability of the coated film. For the determination each test tape was played back in a "pause" under a back tension of 100 g, and the period of time in which the reproducing output decreases to a half of the original level was measured. Sample #2 of Comparative Example 1 that used $\gamma$-$Al_2O_3$ was inferior in durability with an inadequate tape reinforcing effect. Its lack of tape cleaning action caused much head deposition. Sample #3 of Comparative Example 2 using the $\alpha$-$Al_2O_3$ particles having an average particle size of 0.6 $\mu$m and an $\alpha$-transformation rate of 80% indicated poor electromagnetic transfer characteristics because of the large particle size. After endurance running, the tape caused more damage on the head than the other tapes. Sample #4 of Comparative Example 3 that incorporated $\alpha$-$Al_2O_3$ particles with an average particle size of 0.2 $\mu$m and an $\alpha$-transformation rate of 40% had a low head cleaning effect and was inferior in head deposition.

This sample #5 of Example 4 with spherical $\alpha$-$Al_2O_3$ particles having an average particle size of 0.2 $\mu$m and a $\alpha$-transformation rate of 70% had an insufficient cleaning effect and was incomplete in head deposition.

Sample #1 of Example 1, with angular $\alpha$-$Al_2O_3$ particles having an average particle size of 0.2 $\mu$m and an $\alpha$-transformation rate of 70% added in an amount of 5% by weight on the basis of the weight of the ferromagnetic powder, proved superior in all the test items of electromagnetic transfer characteristics, head deposition, head damage, head wear, and still characteristics. The $Al_2O_3$ used for Sample #1 did not contain $\gamma$-$Al_2O_3$ but consisted solely of $\alpha$-$Al_2O_3$ particles, and therefore exhibited an outstanding coated film-reinforcing effect. The average particle size as small as 0.2 $\mu$m enables the powder to meet size reduction of the ferromagnetic powder to give a mixture of particles fine enough to achieve excellent electromagnetic transfer characteristics. The $\alpha$-transformation rate confined to a range above 50% by weight and the particle shape to jagged one enhances the polishing effect and hence the head cleaning effect and reduces the head deposition. For these reasons the alumina that Sample #1 employed is suited as a reinforcing material for high picture quality video tapes.

Comparative Examples 4 and 5 used the same $\alpha$-$Al_2O_3$ as in Example 1 but in different amounts. With 15% by weight of the additive based on the weight of the ferromagnetic powder, the former showed inadequate electromagnetic transfer characteristics and much wear of the head. Conversely, the addition of only 0.5% by weight produced an insufficient reinforcing effect, low durability, and undesirable head deposition. These results demonstrate that an appropriate range of addition is between 0.5 and 15% by weight.

As is obvious from the foregoing, the present invention provides a high quality magnetic recording medium excellent in all of electromagnetic transfer characteristics, head deposition, head damage, head wear, and still characteristics by the adoption of $\alpha$-$Al_2O_3$ having a particle size from 0.1 to 0.3 $\mu$m, an $\alpha$transition rate of 50% or more and angular particle shape.

What is claimed is:

1. A magnetic recording medium comprising a plastic base coated with a magnetic layer of a ferromagnetic powder dispersed in a resin binder, said magnetic layer containing angular $\alpha$-$Al_2O_3$ particles with an average particle size of 0.1 to 0.3 $\mu$m as determined by electron microscopy in an amount of more than 0.5% by weight but less than 15% by weight on the basis of the weight of the ferromagnetic powder, said $Al_2O_3$ particles produced by an organic alumina process and having a rate of transformation to the $\alpha$-type in the crystal structure of at least 50%.

2. A magnetic recording medium according to claim 1, wherein said organic alumina process comprises reacting alkyl aluminum with water to form boehmite and heating the resulting boehmite to liberate the water.

3. A method for producing recording medium according to claim 1, wherein said organic aluminum process comprises reacting alkyl aluminum with water to form boehmite and heating the resulting boehmite to liberate the water.

* * * * *